(12) United States Patent
Abe et al.

(10) Patent No.: US 7,420,762 B2
(45) Date of Patent: Sep. 2, 2008

(54) HEAD SLAP DETECTING DEVICE, STORAGE DEVICE, HEAD SLAP DETECTING METHOD, AND COMPUTER PRODUCT

(75) Inventors: Takao Abe, Kawasaki (JP); Yukio Abe, Kawasaki (JP); Shigenori Yanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 11/588,767

(22) Filed: Oct. 27, 2006

(65) Prior Publication Data

US 2007/0291397 A1 Dec. 20, 2007

(30) Foreign Application Priority Data

Jun. 15, 2006 (JP) .............................. 2006-166615

(51) Int. Cl.
*G11B 21/02* (2006.01)
(52) U.S. Cl. ....................................................... 360/75
(58) Field of Classification Search ................... 360/75, 360/25, 67, 69
See application file for complete search history.

(56) References Cited

U.S. PATENT DOCUMENTS

| 4,937,688 | A  | * | 6/1990  | Sengoku ........................ 360/69 |
| 6,353,315 | B1 | * | 3/2002  | Egan et al. .................... 324/212 |
| 6,445,520 | B1 | * | 9/2002  | Yang et al. ..................... 360/25 |
| 6,501,611 | B1 | * | 12/2002 | Li ............................... 360/67 |

FOREIGN PATENT DOCUMENTS

| JP | 7-006487    | 1/1995 |
| JP | 2003-263853 | 9/2003 |

* cited by examiner

*Primary Examiner*—Fred Tzeng
(74) *Attorney, Agent, or Firm*—Greer, Burns & Crain, Ltd.

(57) ABSTRACT

A head-slap detecting device detects a head slap. The head slap causes a storage medium to be slapped by at least one storage-medium driving unit that performs at least one of reproduction and recording of data from and to the storage medium. The head-slap detecting device includes a detecting unit that detects the head slap by determining whether a first variable gain obtained from a variable gain amplifier that amplifies an output of data reproduced by the storage-medium driving unit exceeds a predetermined threshold.

18 Claims, 5 Drawing Sheets

| | TIME | TEMPERATURE |
|---|---|---|
| 1 | 3:05:05 | 28.1°C |
| 2 | 6:34:31 | 27.2°C |
| 3 | 32:55:51 | 28.7°C |
| 4 | 69:19:01 | 31.6°C |
| 5 | 102:23:59 | 27.9°C |
| 6 | 142:21:58 | 28.3°C |
| 7 | 200:12:33 | 32.8°C |
| 8 | 206:13:55 | 34.9°C |
| 9 | 259:11:44 | 25.3°C |
| 10 | 278:26:39 | 27.5°C |
| 11 | 301:31:28 | 26.8°C |
| 12 | 348:45:19 | 28.2°C | ← TOTAL NUMBER OF DETECTED HEAD SLAPS

HEAD SLAP DETECTING DEVICE, STORAGE DEVICE, HEAD SLAP DETECTING METHOD, AND COMPUTER PRODUCT

BACKGROUND OF THE INVENTION

1. Field of the Invention

The present invention relates to a technology for detecting an occurrence of a head slap in a storage device.

2. Description of the Related Art

Sometimes, shocks are undesirably applied to a magnetic disk device while the magnetic disk device is operating. Various techniques have been proposed for detecting such shocks. One such technique includes detecting the shock with a shock sensor. It is known that the degree of the shock varies depending on the cause of the shock and the environmental condition. Particularly, a shock that affects a floating condition of a head (a unit that reproduces and records of data from and to a disk) and a relationship between the disk and the head is called a "head slap". The head slap is a shock that causes the head to slap a surface of the disk. Through an operation of detecting a shock, information related to the degree of the shock, with which the occurrence of the head slap can be determined, is to be used, for example, for determining how and under what environmental condition a user has been using the magnetic disk device.

When the shock sensor detects a shock, a control is provided to inhibit a write operation (recording operation) on a disk. To detect a shock accurately, the sensitivity of the sensor is set as high as possible. However, with a shock sensor it is difficult to determine whether the shock is a head slap or some other shock.

Japanese Patent Application Laid-open No. H7-6487 has disclosed a technology for detecting whether the shock is a head slap. This publication proposes to use detection data reproduced by a magnetic head that is not used for reproducing and recording of data. According to the disclosed technology, a magnetic head that is not used for reproducing and recording of data in a magnetic disk device is selected, and then the detection data reproduced by the exclusive magnetic head is compared with a predetermined reference value to determine whether a shock is applied to the magnetic disk device. Namely, the occurrence of a head slap can be detected by, for example, determining how much the value of the detection data exceeds the reference value.

However, with the conventional technology, there still is a problem that the process of detecting the occurrence of a head slap is complicated, and therefore, there is a threat that accuracy of the detection of a head slap is to be lowered. Specifically, with the conventional technology, it is required to select a magnetic head that is not used for reproducing and recording of data in the magnetic disk device, resulting in making the process of detecting the occurrence of a head slap complicated. Further, because the detection data used for data comparison is reproduced by the magnetic head that is different from a head used for reproducing and recording of data in the magnetic disk device, the accuracy of detecting the occurrence of a head slap gets lowered.

SUMMARY OF THE INVENTION

It is an object of the present invention to at least partially solve the problems in the conventional technology.

According to an aspect of the present invention, a head-slap detecting device that detects a head slap that causes a storage medium to be slapped by at least one storage-medium driving unit that performs at least one of reproduction and recording of data from and to the storage medium includes a detecting unit that detects whether a head slap has occurred based on whether a first variable gain obtained from a variable gain amplifier that amplifies an output of data reproduced by the storage medium driving unit exceeds a first threshold.

According to another aspect of the present invention, a storage device includes at least one storage-medium driving unit that performs at least one of reproduction and recording of data from and to a storage medium includes a detecting unit that detects whether a head slap has occurred based on whether a first variable gain obtained from a variable gain amplifier that amplifies an output of data reproduced by the storage medium driving unit exceeds a first threshold.

According to still another aspect of the present invention, a head-slap detecting method of detecting a head slap that causes a storage medium to be slapped by at least one storage-medium driving unit that performs at least one of reproduction and recording of data from and to the storage medium includes detecting whether a head slap has occurred based on whether a variable gain obtained from a variable gain amplifier that amplifies an output of the data reproduced by the storage-medium driving unit exceeds a predetermined threshold.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings. A storage device including a head-slap detecting device according to an embodiment of the present invention will be explained.

First, the basic terms used in the embodiments will be explained below. A "storage device" is a device including a disk on which data is magnetically recorded, a disk driving-unit that reproduces and records of data from and to the disk, and a control circuit that controls the disk and the disk driving unit. The "disk" is a disk having a magnetic film coated on a metal or glass disk-like substrate. The "disk driving unit" is a mechanism including a head made of an element that converts magnetism on the disk to an electric signal, and a voice coil motor (VCM) that generates drive force to move the head to a predetermined position. In the "storage device", the disk rotates at a predetermined rotational speed, and the head reproduces and records of data from and to the disk, while floating above the surface of the disk with a minute gap (15 nanometers, for example) between the head and the surface of the disk. The "storage device" is connected to a host computer, and records data transmitted from the host computer onto the disk in response to a "record (write)" command sent from the host computer. In response to a "reproduce (read)" command sent from the host computer, the "storage device" reproduces data from the disk, and transmits the data to the host computer.

Data recorded on the disk includes "user data" that is used in a process to be executed by the host computer, and "servo control data" that is used for performing a head positioning control such as a control of the head to reproduce and record of data at a predetermined position on the disk. When the storage device receives the "reproduce (read)" command from the host computer, the head converts the "servo control data" recorded on the disk into an electric signal to be output. Thereafter, a "variable gain amplifier" of the control circuit in the storage device amplifies the output of the servo control data converted to the electric signal, with a variable gain, to a predetermined voltage. The "variable gain amplifier" sends the amplified "servo control data" to a circuit for performing positioning control where the sent "servo control data" is used to control the positioning of the head. When the head positioning control is finished through the above processing, the storage device converts "user data" recorded at a predetermined position on the disk to an electric signal to be output, by using the head, performs a process such as amplification of the electric signal, and transmits the "user data" to the host computer. Since the "servo control data" is reproduced for performing the head positioning control, the "servo control data" is to be "reproduced" through the head irrespective whether the command sent from the host computer is the "reproduce (read)" command or the "record (write)" command.

A storage device is installed, for example, in a notebook personal computer and is placed under an environment where a shock is likely to be applied to the storage device. When a shock is applied to the storage device, it is assumed that vibration in the x-axis direction, the y-axis direction, or the z-axis direction occurs in the disk driving unit. With regard to the z-axis direction, since the gap between the disk and the head is, for example, approximately 15 nanometers as mentioned above, a shock (vibration) that causes the head to slap the surface of the disk can occur depending on the degree of the shock applied to the storage device. Such a shock (vibration) is called a "head slap".

When the "head slap" occurs frequently, the vibration that causes the head to slap the surface of the disk occurs frequently, resulting in causing the storage device to easily get damaged. Accordingly, for operating the storage device, it is required to detect whether the "head slap" is occurred on the disk and to effectively use information related to the detection of an occurrence of the head slap. A normal shock sensor provided in the storage device can neither identify the direction of the vibration (the x-axis direction, the y-axis direction, and the z-axis direction) nor identify the degree of the vibration. Therefore, it is required to include a "head-slap detecting device" that detects the head slap, in the storage device.

Figure 1:
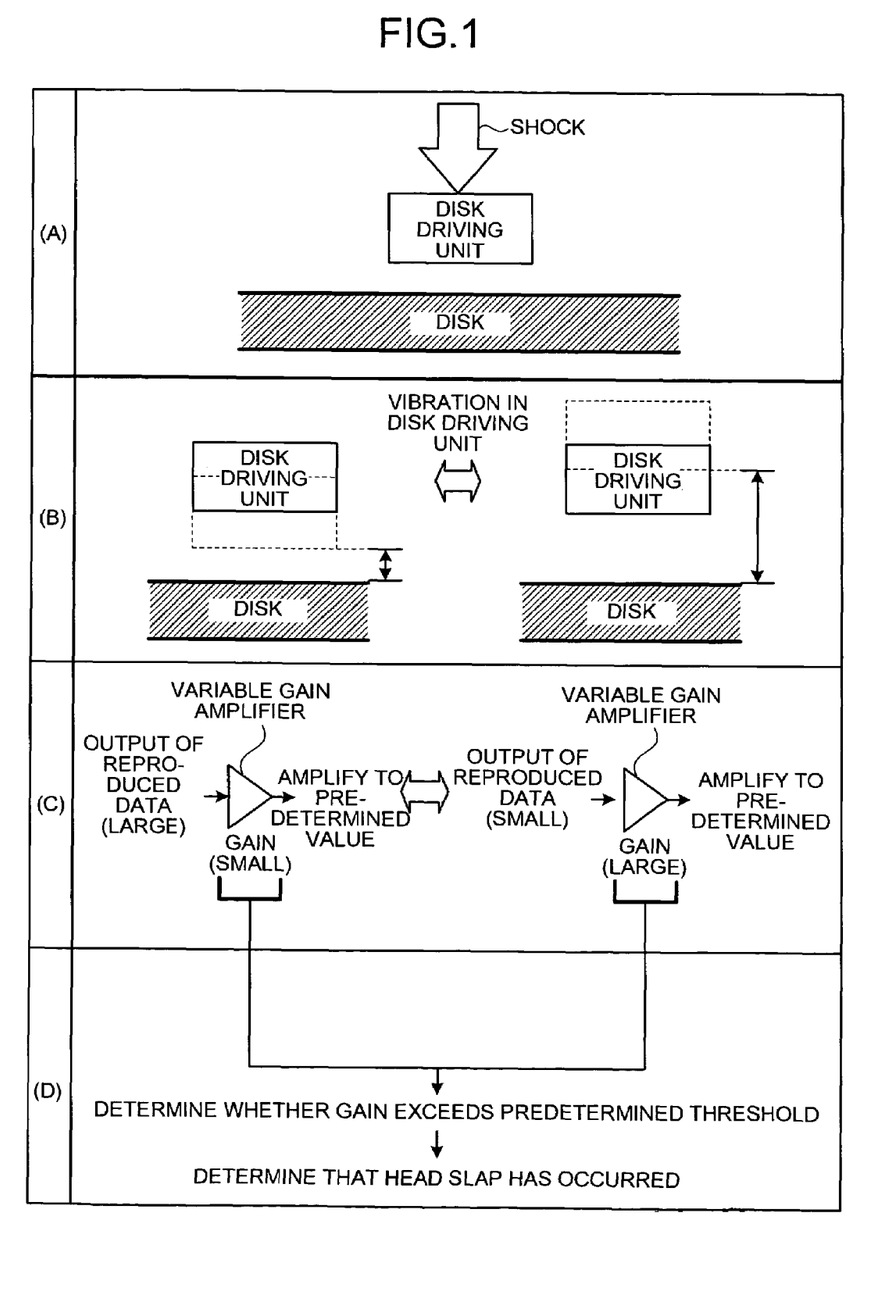
FIG. 1 is a schematic for explaining an overview and salient features of a storage device according to a first embodiment of the present invention.

FIG. 1 is a schematic for explaining an overview and salient features of a storage device according to a first embodiment. The storage device of the first embodiment includes a disk on which user data and servo control data are to be recorded, and a disk driving unit that reproduces and records data from and to the disk. The storage device of the first embodiment can easily and accurately detect the head slap occurred between the disk and the disk driving unit.

As shown in (A) of FIG. 1, it is assumed that a shock is applied to the storage device of the first embodiment, resulting in causing an occurrence of vibrations along the z-axis direction as shown in (B) of FIG. 1, in the disk driving unit of the storage device of the first embodiment. Specifically, when vibrations occur along the z-axis direction occurs, the head (disk driving unit) repeatedly comes close to the disk surface (see, the left part of (B) of FIG. 1) and goes away from the disk surface (see, the right part of (B) of FIG. 1), as shown in (B) of FIG. 1.

At this time, when data is reproduced from the disk, the value of the output of data converted from magnetism to an electric signal through the head becomes large as the head comes close to the disk surface (see, the left part of (C) of FIG. 1), and becomes small as the head moves away from the disk surface (see, the right part of (C) of FIG. 1). As shown in (C) of FIG. 1, the gain of a variable gain amplifier becomes small when the value of the output data is large (see, the left part of (C) of FIG. 1), and becomes large when the value of the output data is small (see, the right part of (C) of FIG. 1). That is, when the vibration of the z-axis direction occurs, the gain of the variable gain amplifier is repeatedly changed from small to large and vice versa.

With such a vibration of the z-axis direction occurred, the head-slap detecting device provided in the disk driving unit of the storage device according to the first embodiment detects a head slap by determining whether the gain of the variable gain amplifier exceeds a predetermined threshold as shown in (D) of FIG. 1.

Since the storage device according to the first embodiment detects the occurrence of a head slap through data reproduced by the disk driving unit (head) that is used for reproducing and recording of data, it is possible to easily and accurately detect the occurrence of a head slap as compared with an operation of detecting the occurrence of a head slap through detection data reproduced by a head that is not used for reproducing and recording of data. The storage device that detects the occurrence of a head slap according to the first embodiment can provide information to be used for determining, for example, under what environmental condition the storage device is being used.

The head-slap detecting device in the storage device according to the first embodiment further detects the occurrence of a head slap when a shock sensor detects an occurrence of vibration in the disk driving unit, detects the occurrence of a head slap using the gain with which the output of the servo control data is amplified, detects the occurrence of a head slap after the gain of a predetermined frequency band is removed (e.g., by using a low-pass filter or the like), and detects the occurrence of a head slap by using the average value of gains of the variable gain amplifier obtained by amplifying each of the outputs of data reproduced in a predetermined time.

Figure 2:
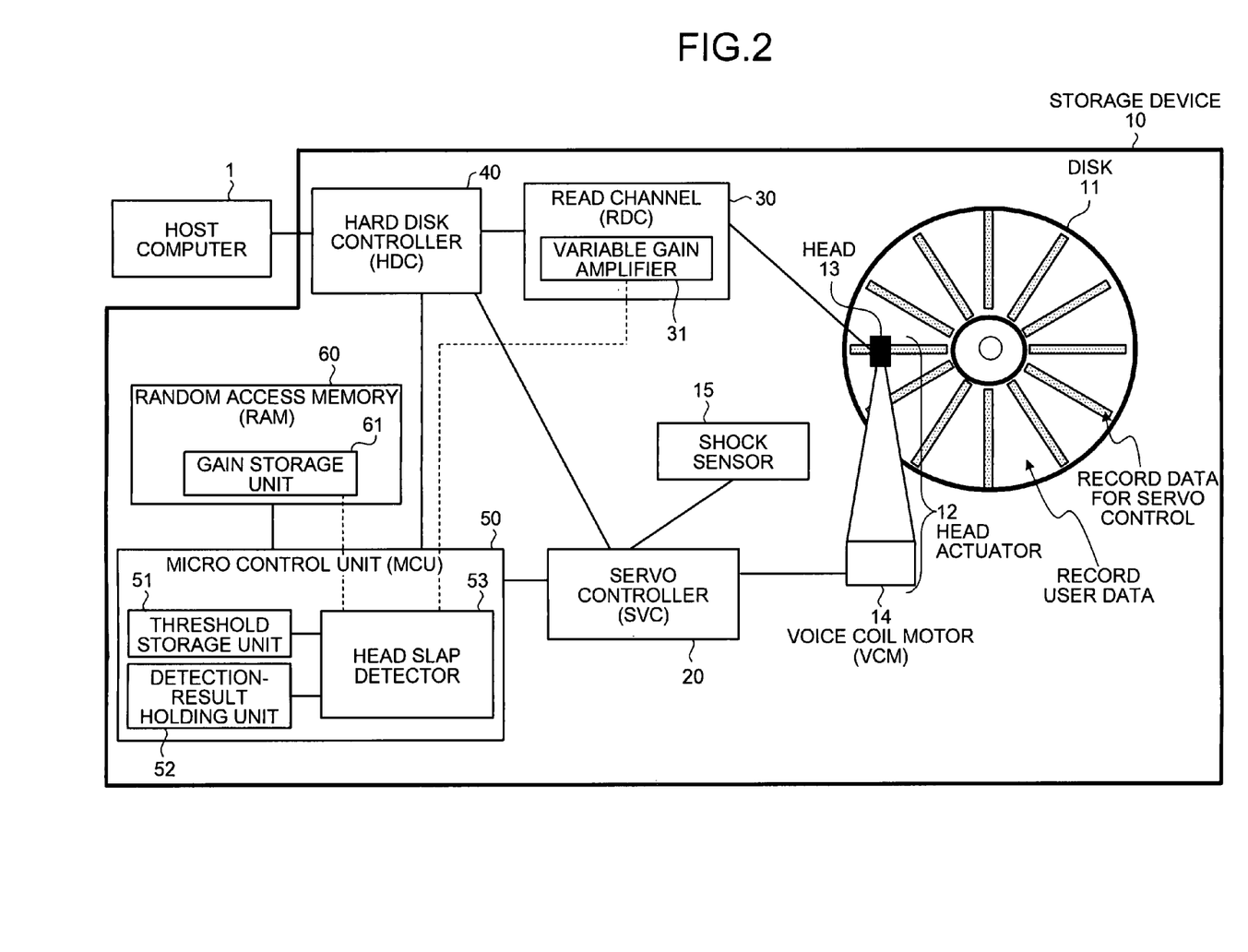
FIG. 2 is a block diagram of a configuration of the storage device according to the first embodiment.
Figure 3:
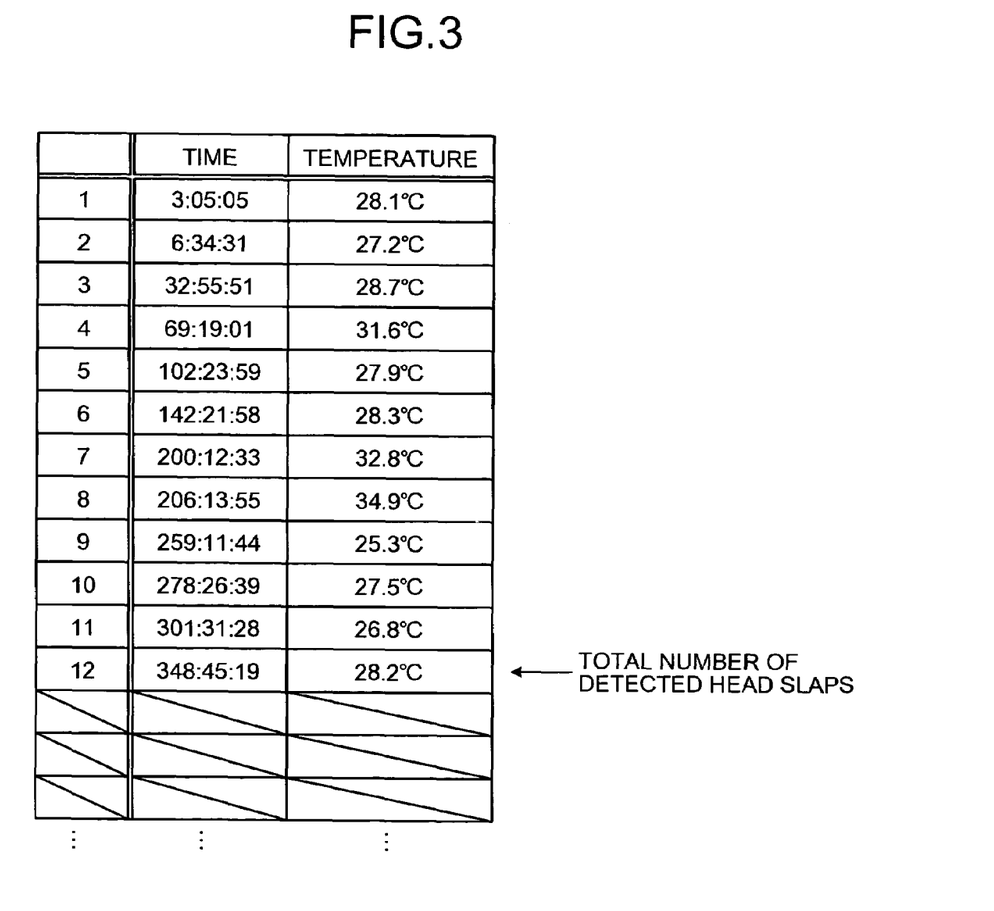
FIG. 3 is an example of the contents of information held by a detection-result holding unit shown in FIG. 2.
Figure 4:
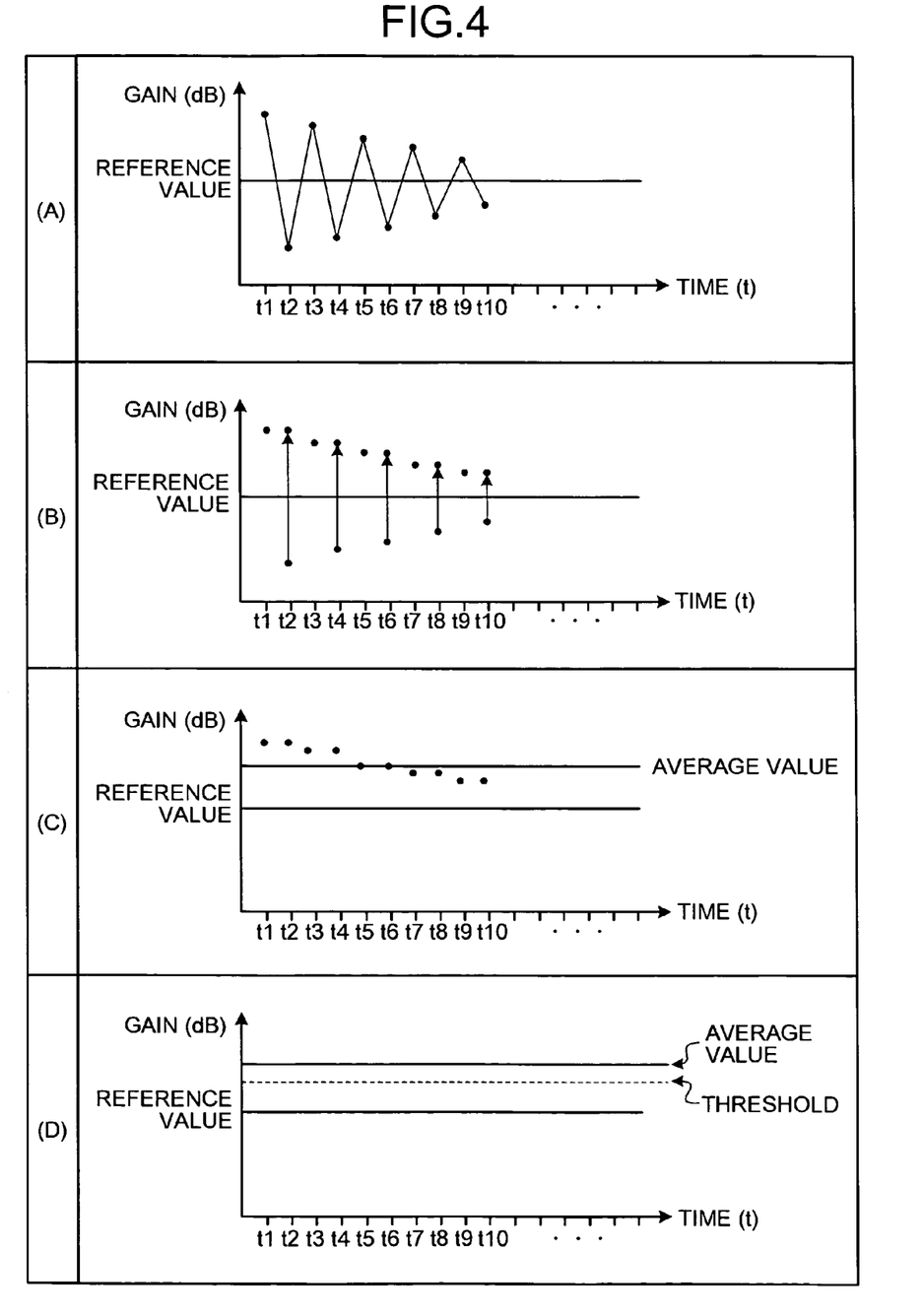
FIG. 4 is a schematic for explaining an operation performed by a head slap detector shown in FIG. 2.

FIG. 2 is a block diagram of the configuration of a storage device 10. FIG. 3 is an example of the contents of information acquired by a detection-result holding unit of the storage device 10. FIG. 4 is a schematic for explaining a head slap detector of the storage device 10.

As shown in FIG. 2, the storage device 10 includes a disk 11, a disk driving unit 12, a shock sensor 15, a servo controller (SVC) 20, a read channel (RDC) 30, a hard disk controller (HDC) 40, a micro control unit (MCU) 50, and a random access memory (RAM) 60. The head-slap detecting device of the storage device 10 is provided in the MCU 50 and the RAM 60.

The disk 11 records user data and servo control data. Specifically, the disk 11 includes a magnetic film coated on a metal or glass disk-like substrate, and the user data and the servo control data are magnetically recorded on the disk 11. The user data is used in a process to be executed by a host computer 1, and the servo control data is used for controlling the disk driving unit 12. The disk driving unit 12 reproduces recorded data (user data and servo control data) from the disk 11, and records data (user data) to the disk 11. The head-slap detecting device according to the first embodiment performs a process for reproducing the servo control data recorded on the disk 11. Data is recorded on the disk 11 through a sector servo system with which the servo control data is recorded in servo areas arranged in radial patterns as shown in FIG. 2 and the user data is recorded in data areas between the servo areas. However, the present invention is not limited to such recording system, and the recording system for the servo control data can be other systems, such as a servo-surface servo system.

The disk driving unit 12 reproduces the user data and the servo control data from the disk 11, and records the user data to the disk 11. As shown in FIG. 2, the disk driving unit 12 includes a head 13 and a voice coil motor (VCM) 14. The head 13 reproduces and records of data from and to the disk 11. Specifically, the head 13 includes an element that converts magnetism into an electric signal, and reproduces and records of data while floating above the rotating disk 11 with a minute gap between the head and the surface of the disk 11. For instance, the head 13 reproduces the user data and the servo control data, both magnetically recorded on the disk 11, and sends an electric signal converted from the data to the RDC 30 via a head amplifier (not shown).

For the head 13 to reproduce and record of the user data on the disk 11 at a predetermined position, the positioning control of the head 13 needs to be performed in the storage device 10, so that the head 13 is positioned at the predetermined position. For example, the positioning control of the head 13 is executed through operations, in which the servo control data reproduced by the head 13 is sent to the MCU 50 via the RDC 30, the HDC 40, and the like, the MCU 50 calculates servo control information (operation amount) based on the servo control data to send the servo control information to the SVC 20, and the SVC 20 controls the VCM 14 based on the servo control information sent from the MCU 50.

The VCM 14 performs the positioning control of the head 13. Specifically, the VCM 14 is a motor that drives the disk driving unit 12, and the positioning control of the head 13 is performed through the rotation of the VCM 14. Further, the VCM 14 is connected to the SVC 20 and controlled by the SVC 20.

The shock sensor 15 detects vibration occurred in the storage device 10. Specifically, the shock sensor 15 includes a piezoelectric element and electrically detects vibration occurred in the storage device 10 by converting the vibration to a voltage through piezoelectric effect. The shock sensor 15 is connected to the SVC 20 and sends information of the vibration detected in the storage device 10 to the SVC 20. For example, when the shock sensor 15 detects the vibration and sends the information of the vibration to the SVC 20, the SVC 20 controls the VCM 14 so that the head 13 is retracted from the disk 11. For such a usage, the sensitivity of the shock sensor 15 is normally set high and the shock sensor 15 can neither identify the direction of the vibration (the X-axis direction, the y-axis direction, and the z-axis direction) nor identify the degree of the vibration. When the shock sensor 15 detects the vibration, the head-slap detecting device according to the first embodiment starts performing processing.

The SVC 20 drives a spindle motor (SPM) (not shown) and the VCM 14. Specifically, the SVC 20 includes a power circuit that drives the SPM that rotates the disk 11, and a power circuit that drives the VCM 14 that performs the positioning control of the head 13. The SVC 20 is connected to the SPM (not shown), the VCM 14, the shock sensor 15, the HDC 40, and the MCU 50. The SVC 20 receives servo control information (operation amount) input from the MCU 50 and controls the VCM 14 based on the servo control information (operation amount). The SVC 20 also receives information of the vibration input from the shock sensor 15 and controls the VCM 14 based on the information of the vibration. The SVC 20 sends the information of the vibration to the HDC 40, the MCU 50, and the like.

The RDC 30 performs code demodulation of data reproduced from the disk 11 and performs code modulation of data to be recorded on the disk 11. Specifically, the RDC 30 includes a circuit that performs signal processing of data and a circuit that acquires information for performing servo control from the servo control data. The RDC 30 is connected to the head 13 and the HDC 40 (the RDC 30 is connected to the head 13 via a head amplifier (not shown)). The RDC 30 also includes a variable gain amplifier (VGA) 31 as shown in FIG. 2.

The VGA 31 in the RDC 30 performs an operation when data is reproduced, and amplifies the output of data reproduced from the disk 11 with a variable gain. Specifically, the VGA 31 includes a circuit that amplifies an input electric signal with a variable gain, and is connected to the head amplifier (not shown) and a decoder (not shown). The VGA 31 is connected to a head slap detector 53 of the MCU 50 via the HDC 40 and sends the value of the gain to the head slap detector 53 (see, the dotted line in FIG. 2).

The operation of the VGA 31 will be specifically explained along with the operations of relevant units. The head 13 reproduces data magnetically recorded on the disk 11, converts the data to an electric signal to be output, and sends the electric signal to the head amplifier (not shown). The head amplifier amplifies the sent data (electric signal) to be output, and sends the data (electric signal) to the VGA 31 of the RDC 30. The VGA 31 further amplifies the sent data (electric signal) to be output, with a variable gain, and sends the amplified data (electric signal) to the decoder in the RDC 30. The decoder performs processes, such as wave shaping of the data (electric signal) amplified by the VGA 31, and code demodulation through a demodulation circuit, and sends the data to the HDC 40 or the like.

When the VGA 31 amplifies the output of data (electric signal) reproduced by the head 13 with a variable gain, there is a certain relationship between the output of the data and the gain. When the value of the output of the data reproduced by the head 13 is large, the value of the variable gain is reduced, and when the value of the output of the data reproduced by the head 13 is small, the value of the variable gain is increased, so that the data can be output with the same value in both cases.

The case that the size of the output of the data reproduced by the head 13 is large is supposed to be a case when the head 13 comes close to the surface of the disk 11, and the case that the size of the output of the data reproduced by the head 13 is small is supposed to be a case when the head 13 moves away from the surface of the disk 11. That is, there is a relationship such that the value of the gain of the VGA 31 decreases when the head 13 comes close to the surface of the disk 11, and the value of the gain of the VGA 31 increases when the head 13 moves away from the surface of the disk 11. The head-slap detecting device according to the first embodiment detects a head slap using the relationship between the output of the data and the gain.

The HDC 40 performs interface control between the host computer 1 and the storage device 10 and performs interface control between the individual units in the storage device 10. Specifically, the HDC 40 includes an error correction circuit that corrects an error of data to be transmitted between the host computer 1 and the storage device 10, and an interface control circuit that controls an interface or the like between the RDC 30 and the MCU 50. The HDC 40 is connected to the host computer 1, the SVC 20, the RDC 30, and the MCU 50. The HDC 40 receives data (user data) input from the host computer 1, adds an error correction code to the data, and sends the data to the RDC 30. For example, the HDC 40 receives data (user data) input from the RDC 30, performs error correction of the data if required, and sends the data to the host computer 1. Further, the HDC 40 receives a gain input from the VGA 31 and sends the gain to the head slap detector 53 of the MCU 50.

The MCU 50 performs entire control of the storage device 10 and the positioning control of the head 13. Specifically, the MCU 50 includes a central processing unit (CPU) and a read only memory (ROM), and is connected to the SVC 20, the HDC 40, and the RAM 60. As shown in FIG. 2, the MCU 50 includes, as the head-slap detecting device, a threshold storage unit 51, a detection-result holding unit 52, and the head slap detector 53, all of which are constituted by program modules of software programs.

The threshold storage unit 51 in the MCU 50 stores a predetermined threshold that is used by the head slap detector 53. Specifically, the threshold storage unit 51 stores a threshold that is used by the head slap detector 53 for determining whether the gain of the VGA 31 exceeds the predetermined threshold.

When the head slap detector 53 detects a head slap, the detection-result holding unit 52 holds information related to the head slap. Specifically, the detection-result holding unit 52 holds information related to the head slap, such as number of occurrences of head slaps, time of occurrence, and temperature when a head slap has occurred. The information related to the head slap can be stored and held on the disk or in the RAM.

As shown in FIG. 3, the detection-result holding unit 52 holds the number of occurrences of head slaps (which occurrence), the time at which the head slap has occurred, which is represented with total drive time of the storage device 10, and the temperature of the storage device 10 when the head slap has occurred, all of which are associated with one another. For example, the row "5" represents information on the fifth head slap occurred in the storage device 10, and includes information of "102 hours, 23 minutes and 59 seconds" as the time of occurrence of the head slap, which is timed since the driving of the storage device 10 started, and "27.9° C." as the temperature of the storage device 10 when the head slap has occurred which are associated with one another. In FIG. 3, the detection-result holding unit 52 holds information of "12 times" as the total number of occurrences of head slaps. The first embodiment has been explained with the case that the number of occurrences of head slaps, the time of occurrence, and the temperature when a head slap has occurred are held in the detection-result holding unit 52, in association with one another, as shown in FIG. 3. However, the present invention is not limited thereto, and any information related to a head slap can be held. For example, the value of the gain when a head slap is detected can be held in addition.

The head slap detector 53 detects a head slap by determining whether the gain of the VGA 31 exceeds the predetermined threshold. Specifically, the head slap detector 53 is connected to the SVC 20, the HDC 40, and the RAM 60, acquires the gain of the VGA 31 when performing a process of detecting the head slap, removes the gain of a predetermined frequency band from the acquired gain (e.g., using a low-pass filter or the like), and stores the gain in a gain storage unit 61. The head slap detector 53 detects the head slap by determining whether the gain stored in the gain storage unit 61 exceeds the predetermined threshold stored in the threshold storage unit 51, and stores information related to the head slap in the detection-result holding unit 52 when the head slap is detected.

Specifically, the head slap detector 53 checks whether the gain exceeds the predetermined threshold when vibration is detected by the shock sensor 15. That is, when the vibration is detected by the shock sensor 15, the head slap detector 53 receives information of the vibration input from the shock sensor 15, and starts a head-slap detecting process in response to the information.

When the output of servo control data is amplified with the variable gain of the VGA 31, the head slap detector 53 checks whether the gain exceeds the predetermined threshold. That is, the head slap detector 53 acquires the gain when the servo control data is reproduced from the disk 11 by the head 13 and is amplified by the VGA 31, and checks whether the gain of the VGA 31 exceeds the predetermined threshold.

When each of a plurality of outputs of data reproduced during a predetermined time is amplified with each of corresponding variable gains of the VGA 31, the head slap detector 53 checks whether the average value of the gains exceeds the predetermined threshold. That is, when vibration is detected by the shock sensor 15, the head slap detector 53 starts counting down a predetermined time, acquires a plurality of gains reproduced during the predetermined time, and checks whether the average value of the gains exceeds the predetermined threshold.

FIG. 4 is a schematic for explaining a check operation performed by the head slap detector 53. A "reference value" shown in FIG. 4 is the gain of the VGA 31 when the head 13 reproduces data from the disk 11 with no vibration occurred in the disk driving unit 12. When the vibration of the z-axis direction occurs in the disk driving unit 12, the head slap detector 53 starts counting down a predetermined time, and continuously acquires the gain of the VGA 31 until the countdown of the predetermined time is finished. For example, it is assumed that the head slap detector 53 has acquired ten gains from t1 to t10 in FIG. 4. As shown in (A) of FIG. 4, the value of the gain of the VGA 31 is repeatedly changed between a large value that is greater than the reference value and a small value that is smaller than the reference value, and the difference between the large value and the small value is gradually reduced as time passes during the predetermined time.

As shown in (B) of FIG. 4, the head slap detector 53 corrects the value of the gain that is smaller than the reference value to a new value by adding the difference between the gain and the reference value to the reference value. The head slap detector 53 calculates the average value of the corrected gains as shown in (C) of FIG. 4. Thereafter, the head slap detector 53 checks whether the average value of the corrected gains exceeds the predetermined threshold as shown in (D) of FIG. 4 to detect a head slap.

Although the first embodiment is explained with the operation such that a value of the gain that is smaller than the reference value is corrected to a new value by adding the difference between the value of the gain and the reference value to the reference value, and the corrected value of the gain is used for the comparison, other calculations can be used if effective to compare the value of the gain with the reference value through the relationship between the output of data and the gain. For example, the calculation can be performed by using only the gains which values are greater than the reference value, without using the gains which values are smaller than the reference value.

The RAM 60 temporarily stores data in the storage device 10. Specifically, the RAM 60 is connected to the MCU 50, and temporarily stores data used in the MCU 50. The RAM 60 includes the gain storage unit 61 as the head-slap detecting device as shown in FIG. 2.

The gain storage unit 61 of the RAM 60 stores the gain of the VGA 31. Specifically, the gain storage unit 61 receives the gain of the VGA 31, acquired and sent by the head slap detector 53, and stores the received gain.

While the storage device 10 is explained through the configuration shown in FIG. 2, the invention is not thus limited. For example, various configurations and connection modes can be made, including an integral configuration of the RDC 30, the HDC 40, and the MCU 50, a configuration including other units (not shown), and a configuration having the threshold storage unit 51 and the gain storage unit 61 provided in units different from the MCU 50 and the RAM 60 shown in FIG. 2.

Figure 5:
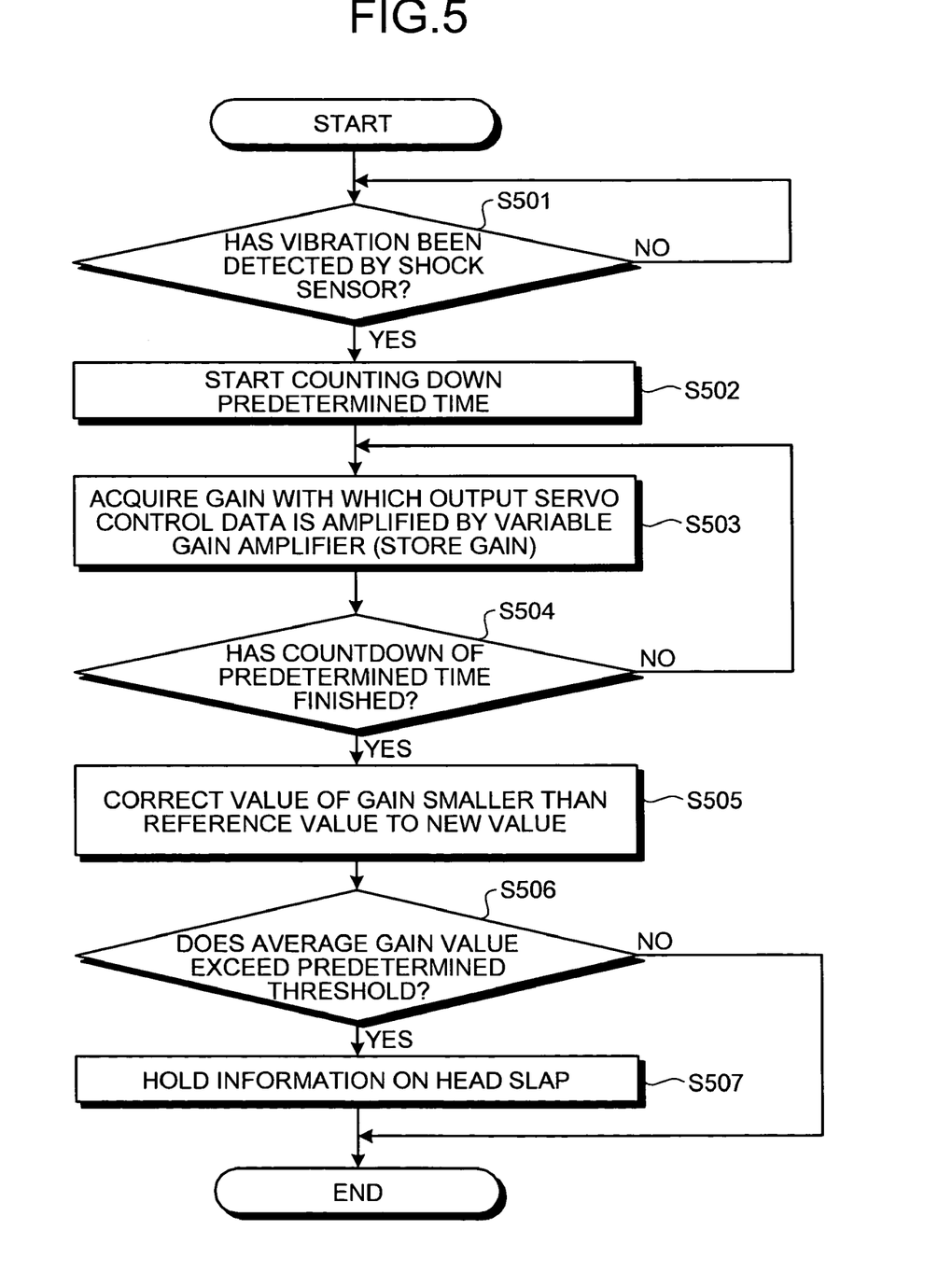
FIG. 5 is a flowchart of a process procedure performed by the storage device shown in FIG. 2.

FIG. 5 is a flowchart of a process procedure performed by the storage device 10. Among the processes of the storage device 10, a head-slap detecting process that is performed by the head-slap detecting device (i.e., the head slap detector 53) provided in the storage device 10 will be explained below.

The head slap detector 53 in the storage device 10 determines whether the shock sensor 15 has detected vibration (step S501). When the shock sensor 15 has not detected vibration (No at step S501), the head slap detector 53 returns to the process of determining whether vibration has been detected (step S501).

When the shock sensor 15 has detected vibration (Yes at step S501), the head slap detector 53 starts counting down a predetermined time (step S502).

The head slap detector 53 acquires a gain with which the output of servo control data is amplified by the VGA 31 (step S503). Specifically, the head slap detector 53 acquires the gain with which the output of servo control data is amplified with the variable gain by the VGA 31 in the storage device 10, subtracts the gain of a predetermined frequency band from the acquired gain (by using a low-pass filter, for example), and stores the gain in the gain storage unit 61.

The head slap detector 53 determines whether the countdown of the predetermined time is completed (step S504). When the countdown is not completed (No at step S504), the head slap detector 53 returns to the process of acquiring a gain with which the output of data is amplified with the variable gain by the VGA 31 (step S503).

When the countdown is completed (Yes at step S504), the head slap detector 53 performs a process of correcting a gain which value is smaller than the reference value to a new value by adding the difference between the value of the gain and the reference value to the reference value (step S505). Specifically, the head slap detector 53 acquires a gain stored in the gain storage unit 61, and corrects the gain when the value of the gain is smaller than the reference value to a new value by adding the difference between the value of the gain and the reference value to the reference value.

The head slap detector 53 calculates the average value of gains, and determines whether the average value of the gains exceeds a predetermined threshold (step S506). When the average value of the gains does not exceed the predetermined threshold (No at step S506), the storage device 10 terminates the process.

When the average value of the gains exceeds the predetermined threshold (Yes at step S506), the detection-result holding unit 52 of the storage device 10 holds information related to a head slap (step S507). Specifically, the detection-result holding unit 52 of the storage device 10 holds information as head slap information, including the number of occurrences of head slaps, the time of occurrence, and the temperature when the head slap has occurred.

Since the storage device 10 detects the occurrence of a head slap by using data that is reproduced from a disk driving unit (head) used for reproducing and recording of data, it is possible to easily and accurately detect the occurrence of a head slap as compared with an operation of detecting the occurrence of a head slap by using detection data reproduced by a head that is not used for reproducing and recording data. Therefore, the storage device that detects the occurrence of a head slap in this manner can provide information to be used for determining, for example, under what environmental condition the storage device is being used.

As explained above, according to the first embodiment, a head-slap detecting device or a storage device detects a head slap occurred between a storage medium and a storage-medium driving unit that performs at least one of reproduction and recording of data from and to the storage medium, and detects the head slap by determining whether the variable gain of the variable gain amplifier, which amplifies output of data reproduced by the storage-medium driving unit with the variable gain, exceeds a predetermined threshold. Accordingly, the occurrence of a head slap can be detected using data that is reproduced from a disk driving unit (head) used for reproducing and recording of data. Specifically, when a head slap occurs, there generates a change in the clearance between a disk and the head, and a change of the output of the data reproduced by the head, resulting in causing a change of the gain of the variable amplifier. Accordingly, the occurrence of the head slap can be detected by comparing the gain of the variable gain amplifier with the threshold. As a result, it is possible to ensure easy and accurate detection of the occurrence of a head slap as compared with an operation of detecting the occurrence of a head slap by using detection data reproduced by a head that is not used for reproducing and recording of data.

Further, according to the first embodiment, when a head slap is detected, information related to the head slap (e.g., the number of occurrences of head slaps, the time of occurrence, and the temperature when a head slap has occurred) is held by the head-slap detecting device or by the storage device Therefore, it is possible to effectively use the information related to the occurrence of a head slap for performing the Self-Monitoring, Analysis and Reporting Technology (SMART) of a disk apparatus to determine, for example, under what environmental condition the disk apparatus is used by a user.

Moreover, according to the first embodiment, a head slap is detected by determining whether the gain of the variable gain amplifier exceeds the predetermined threshold when the output of servo control data is amplified by the variable gain amplifier, with the variable gain. Accordingly, the occurrence of the head slap can be detected only using the gain with which the output of the servo control data that is used for a reproduction is amplified. Therefore, it becomes possible to assuredly detect the occurrence of the head slap, compared to a normal operation of detecting a head slap by using a gain with which the output of user data used not only for a reproduction but also for a recording is amplified. With the normal operation, because a normal variable gain amplifier operates only when data is reproduced, the occurrence of the head slap cannot be detected when the data is to be recorded.

Further, according to the first embodiment, when the shock sensor that detects vibration occurred in the storage medium driving unit detects the vibration, it is determined whether the variable gain exceeds the predetermined threshold. Accordingly, the occurrence of a head slap can be detected based on the detection of the occurrence of vibration in the disk driving unit. As a result, it becomes possible to reliably detect the occurrence of a head slap as compared with an operation of detecting the occurrence of a head slap by sampling the gain with which the output of data is amplified.

Moreover, according to the first embodiment, a head slap is detected by determining whether the average value of gains of the variable gain amplifier exceeds the predetermined threshold when plural pieces of outputs of data reproduced in a predetermined time period are amplified by the variable gain amplifier, with corresponding variable gains. Accordingly, the occurrence of a head slap is not detected when the gain momentarily exceeds the predetermined threshold due to damages or contamination of the disk. As a result, it is possible to accurately detect the occurrence of a head slap as compared with an operation of detecting the occurrence of a head slap even when the gain momentarily exceeds the predetermined threshold. It is also possible to take into consideration the influence of the delay in a head movement that occurs after a head slap.

Further, according to the first embodiment, a head slap is detected by determining whether the gain of the variable gain amplifier after subtracting a gain of a predetermined frequency band from the gain exceeds the predetermined threshold. Accordingly, the occurrence of a head slap is detected based on a limited gain necessary for detecting a head slap by removing, for example, data of a high-frequency band that is hardly a cause for a head slap. As a result, it is possible to efficiently and accurately detect the occurrence of a head slap as compared with an operation of detecting a head slap using all the gains.

Although the storage device 10 according to the first embodiment has been explained, the present invention can be embodied in various modes other than the first embodiment. A storage device according to a second embodiment of the present invention will be explained below.

The first embodiment has been explained with the operation of holding information related to a head slap when the head slap is detected. However, the present invention is not limited thereto, and can be similarly adapted to configurations such that information related to a head slap is not acquired when the head slap is detected and another process is to be performed (e.g., retracting of the head from above the disk), or such that information related to a head slap is acquired and another process is to be performed when a head slap is detected.

Further, according to the first embodiment, the variable gain of the variable gain amplifier with which the output of the servo control data is amplified is used. However, the present invention is not limited thereto, and the variable gain amplifier with which the output of the user data is amplified can be used.

Moreover, according to the first embodiment, a head slap is detected by the shock sensor in response to a detection of vibration occurred in the storage medium driving unit. However, the present invention is not limited thereto, and a head slap can be detected in response to an occurrence of other causes, such as when the value of the gain of the variable gain amplifier indicates an abnormal value.

Further, according to the first embodiment, the gains of the variable gain amplifier with which plural pieces of the output of data reproduced in a predetermined time period are amplified are used. However, the present invention is not limited thereto, and a single gain of the variable gain amplifier with which a single piece of data reproduced is amplified can be used.

Moreover, according to the first embodiment, an operation is performed, of determining whether the gain of the variable gain amplifier, from which a gain of a high-frequency band is subtracted, exceeds a predetermined threshold. However, the present invention is not limited thereto, and can be similarly adapted to an operation of comparing gains of all frequency bands with the predetermined threshold, and an operation of determining whether the gain excluding a gain of a predetermined frequency band other than a high-frequency band exceeds the predetermined threshold.

Further, according to the first embodiment, a common threshold is used for a plurality of disk driving units. However, the present invention is not limited thereto, and a specific threshold set for each disk driving unit can be used, information of a temperature in the disk driving unit can be acquired, and a threshold set in response to the acquired temperature information can be used.

Accordingly, since a head slap is detected by determining whether the variable gain of the variable gain amplifier exceeds the a specific threshold set for the storage-medium driving unit, the occurrence of a head slap can be detected by determining whether the variable gain of the variable gain amplifier exceeds the specific threshold set for a disk driving unit in consideration of the specific characteristic of the disk driving unit. Therefore, the occurrence of a head slap can be detected with a high accuracy as compared with the operation of detecting the occurrence of a head slap depending on whether the gain exceeds a uniformly set threshold without considering the specific characteristic of the disk driving unit.

Further, since a head slap is detected by acquiring information of a temperature of the storage-medium driving unit, and determining whether the variable gain of the variable gain amplifier exceeds a threshold set in response to the acquired temperature information, the occurrence of a head slap can be detected by determining whether the variable gain of the variable gain amplifier exceeds the threshold set in consideration of the characteristic of the disk driving unit that can be changed due to a change of the temperature in the disk driving unit. Accordingly, the occurrence of a head slap can be detected with a high accuracy as compared with the operation of detecting the occurrence of a head slap by determining whether the gain exceeds a fixed threshold without taking into account the characteristic of the disk driving unit that can be changed due to the change of the temperature.

The respective constituents of each device shown in the drawings are functionally conceptual, and physically the same configuration is not always necessary. Further, while it is explained that the above embodiment is realized by using firmware of a CPU, the invention is not limited thereto, and using other configurations can be also adapted to the invention. In other words, the specific mode of dispersion and integration of the each device is not limited to the ones shown in the drawings (FIG. 2, for example), and all or a part thereof can be functionally or physically dispersed or integrated in an optional unit (for example, the RDC 30, the HDC 40, and the MCU 50 can be integrally configured), according to various kinds of load and a status of use. Further, all or a part of the various process functions performed by the each device can be achieved by an MCU (or a processor, such as a CPU or MPU) and a program analyzed and executed by the MCU, or can be achieved as hardware by a wired logic.

The head slap detection (the head slap detecting program) described in the above embodiments can be achieved by making the MCU in a disk apparatus as a computer that executes a program. The program can be distributed via a network such as the Internet. Further, the program is stored in a computer-readable recording medium, such as a hard disk, a flexible disk (FD), a compact disk-read only memory (CD-ROM), a magneto optical (MO) disk, a digital versatile disk (DVD), and the like, and can be executed by being read from the recording medium by the computer.

According to an embodiment of the present invention, the occurrence of a head slap is detected using data that is reproduced from a disk driving unit (head) used for reproducing and recording of data. Specifically, when a head slap occurs, there generates a change in the clearance between a disk and the head, and a change of the output of the data reproduced by the head, resulting in causing a change of the gain of the variable amplifier. Accordingly, the occurrence of the head slap can be detected by comparing the gain of the variable gain amplifier with the threshold. Therefore, it becomes possible to ensure easy and accurate detection of the occurrence of a head slap as compared with an operation of detecting the occurrence of a head slap by using detection data reproduced by a head that is not used for reproducing and recording of data. As a result, it becomes possible to provide information used for determining, for example, under what environmental condition the storage device is used by a user.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-slap detecting device that detects a head slap that causes a storage medium to be slapped by at least one storage-medium driving unit that performs at least one of reproduction and recording of data from and to the storage medium, the head-slap detecting device comprising:
a detecting unit that detects whether a head slap has occurred based on whether a first variable gain obtained from a variable gain amplifier that amplifies an output of data reproduced by the storage medium driving unit exceeds a first threshold.

2. The head-slap detecting device according to claim 1, further comprising a storing unit that stores therein information related to the head slap when the detecting unit detects the head slap.

3. The head-slap detecting device according to claim 1, wherein the detecting unit detects whether the head slap has occurred based on whether a second variable gain obtained by amplifying an output of servo control data through the variable gain amplifier exceeds a second threshold.

4. The head-slap detecting device according to claim 1, wherein the detecting unit determines whether the first variable gain exceeds the first threshold when a shock sensor that detects vibration occurred in the storage-medium driving unit detects the vibration.

5. The head-slap detecting device according to claim 1, wherein the detecting unit detects whether the head slap has occurred based on whether a third variable gain exceeds a third threshold, wherein the third variable gain is an average of gains obtained by amplifying outputs of plural pieces of data reproduced during a predetermined time through the variable gain amplifier.

6. The head-slap detecting device according to claim 1, wherein the detecting unit detects whether the head slap has occurred based on whether a fourth variable gain obtained by subtracting a gain of a predetermined frequency band from the first variable gain exceeds a fourth threshold.

7. The head-slap detecting device according to claim 1, wherein the detecting unit detects whether the head slap has occurred based on whether the first variable gain exceeds a threshold set for each of the storage-medium driving unit.

8. The head-slap detecting device according to claim 1, further comprising an acquiring unit that acquires temperature information indicative of temperature of the storage-medium driving unit, wherein
the detecting unit detects whether the head slap has occurred based on whether the first variable gain exceeds a threshold corresponding to the temperature information acquired by the acquiring unit.

9. A storage device including at least one storage-medium driving unit that performs at least one of reproduction and recording of data from and to a storage medium, the storage device comprising:
a detecting unit that detects whether a head slap has occurred based on whether a first variable gain obtained from a variable gain amplifier that amplifies an output of data reproduced by the storage medium driving unit exceeds a first threshold.

10. The storage device according to claim 9, further comprising a storing unit that stores therein information related to the head slap when the detecting unit detects the head slap.

11. The storage device according to claim 9, wherein the detecting unit detects whether the head slap has occurred based on whether a second variable gain obtained by amplifying an output of servo control data through the variable gain amplifier exceeds a second threshold.

12. The storage device according to claim 9, wherein the detecting unit determines whether the first variable gain exceeds the first threshold when a shock sensor that detects vibration occurred in the storage-medium driving unit detects the vibration.

13. The storage device according to claim 9, wherein the detecting unit detects whether the head slap has occurred based on whether a third variable gain exceeds a third threshold, wherein the third variable gain is an average of gains obtained by amplifying outputs of plural pieces of data reproduced during a predetermined time through the variable gain amplifier.

14. The storage device according to claim 9, wherein the detecting unit detects whether the head slap has occurred based on whether a fourth variable gain obtained by subtracting a gain of a predetermined frequency band from the first variable gain exceeds a fourth threshold.

15. The storage device according to claim 9, wherein the detecting unit detects whether the head slap has occurred based on whether the first variable gain exceeds a threshold set for each of the storage-medium driving unit.

16. The storage device according to claim 9, further comprising an acquiring unit that acquires temperature information indicative of temperature of the storage-medium driving unit, wherein
the detecting unit detects whether the head slap has occurred based on whether the first variable gain exceeds a threshold corresponding to the temperature information acquired by the acquiring unit.

17. A head-slap detecting method of detecting a head slap that causes a storage medium to be slapped by at least one storage-medium driving unit that performs at least one of reproduction and recording of data from and to the storage medium, the head-slap detecting method including:

detecting whether a head slap has occurred based on whether a variable gain obtained from a variable gain amplifier that amplifies an output of the data reproduced by the storage-medium driving unit exceeds a predetermined threshold.

18. A computer-readable recording medium that stores therein a computer program that causes a computer to detect a head slap that causes a storage medium to be slapped by at least one storage-medium driving unit that performs at least one of reproduction and recording of data from and to the storage medium, the computer program causing the computer to execute:

detecting whether a head slap has occurred based on whether a variable gain obtained from a variable gain amplifier that amplifies an output of the data reproduced by the storage-medium driving unit exceeds a predetermined threshold.

* * * * *